United States Patent [19]

Blom et al.

[11] 4,367,868

[45] Jan. 11, 1983

[54] REFRACTORY LINING FOR A METAL PIPE

[75] Inventors: Ingvar G. A. Blom; Reima J. Vuokivi, both of Nyhamnsläge, Sweden

[73] Assignee: Hoganas AB, Sweden

[21] Appl. No.: 245,347

[22] PCT Filed: Feb. 28, 1980

[86] PCT No.: PCT/SE80/00056

§ 371 Date: Oct. 1, 1980

§ 102(e) Date: Oct. 1, 1980

[87] PCT Pub. No.: WO80/01923

PCT Pub. Date: Sep. 18, 1980

[30] Foreign Application Priority Data

Mar. 16, 1979 [SE] Sweden ............................ 7902388

[51] Int. Cl.³ .............................................. C21C 5/32
[52] U.S. Cl. .................................... 266/225; 266/270
[58] Field of Search ............... 266/265, 270, 280, 282, 266/285, 286, 225, 226

[56] References Cited

U.S. PATENT DOCUMENTS

| | | | |
|---|---|---|---|
| 1,793,849 | 2/1931 | Groninger | 266/270 |
| 2,023,025 | 12/1935 | McKee | 266/270 |
| 3,031,178 | 4/1962 | White | 266/265 |
| 3,779,534 | 12/1973 | Leroy et al. | 266/268 |
| 3,971,548 | 7/1976 | Folgero et al. | 266/265 |
| 3,976,286 | 8/1976 | Thompson et al. | 266/225 |
| 4,123,042 | 10/1978 | Pearce et al. | 266/270 |

FOREIGN PATENT DOCUMENTS 2439700 3/1975 Fed. Rep. of Germany .

OTHER PUBLICATIONS

The American Heritage Dictionary of the English Language, Houghton Mifflin Co., Boston, 1969, p. 760.

Primary Examiner—John P. Sheehan
Attorney, Agent, or Firm—Burns, Doane, Swecker & Mathis

[57] ABSTRACT

A metal pipe, which is to be protected from high temperature and from the attack of molten metals and slags, is protected by an exterior lining consisting of a refractory ceramic composition which has been moulded between two coaxially placed tubes. The inner tube and preferably also the outer tube is a thin-walled metal tube permitting the lining to slide on the metal pipe on thermal movements.

5 Claims, 5 Drawing Figures

U.S. Patent  Jan. 11, 1983  Sheet 1 of 2  4,367,868
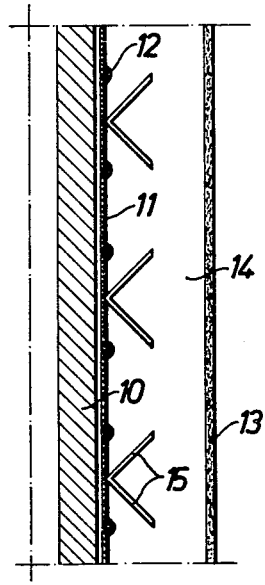
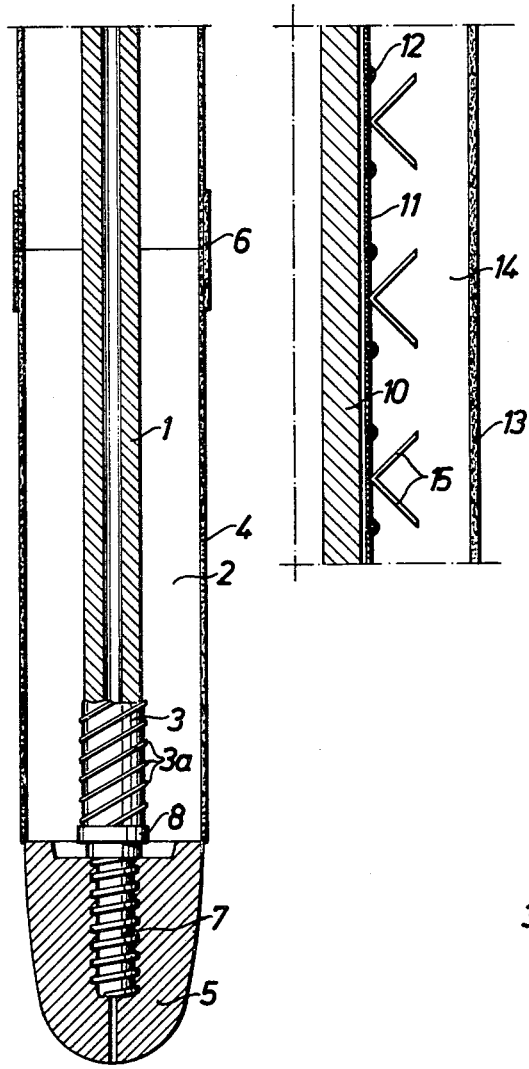
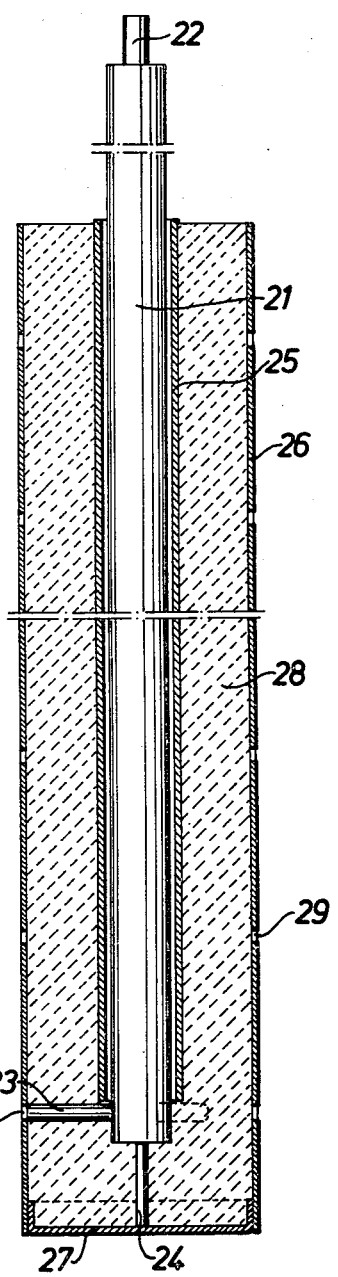

REFRACTORY LINING FOR A METAL PIPE

TECHNICAL FIELD

The invention relates to a refractory sheath for a metal pipe or tube, preferably a steel pipe, which is to be protected from high temperature and from the attack of molten metals and slags. The sheath in accordance with the invention is preferably intended for use with so-called lances in metallurgical processes, e.g. lances for injecting a gas into a molten metal. To advantage, the sheath can also be used for protecting metal pipes and tubes in general, e.g. burner lances for cement furnaces and cooling tubes in pusher-type furnace.

BACKGROUND ART

Lances intended for metallurgical processes consist in principle of a steel tube provided with a nozzle at one end and a lance holder at the order, the tube being surrounded by a refractory casing or sheath. This refractory sheath was originally made up from annularly shaped refractory bricks, joined to each other with refractory mortar. In this case, however, as with most metallurgical sheaths, there is a tendency to go over to a so-called monolithic sheath, which is generally more resistant and more simple to produce.

Monolithic sheaths have the disadvantage of not being self-supporting to the same extent as those made from prefabricated bricks. They have not been able to be made with an insulating air gap between the sheath and the lance pipe, as with the sheaths made from annularly shaped bricks, since attempts to do so have much too often led to cracks in the sheath, with the risk of molten metal penetrating through the cracks to the lance pipe and melting it. The monolithic sheaths have so far usually been made by moulding a refractory composition in a mould in which the lance pipe forms the inner wall. Anchoring pieces have usually been welded onto the lance pipe to ensure retention of the sheath. However, such a construction also leads to the formation of cracks in the sheath due to thermal stresses caused by the great temperature difference between the sheath which is in contact with the molten metal having a temperature of say 1600° C., and the lance pipe, which can have a temperature below 100° C. due to the heavy air blast through it.

DISCLOSURE OF INVENTION

The invention relates to a sheath for a metal tube or pipe which enables the avoidance or reduction of said disadvantages. The inventive sheath is characterized in that it comprises two coaxially placed cylindrical walls, between which there is moulded a refractory ceramic composition, the inner cylindrical wall consisting of a metal tube which can slide on the metal pipe to enable thermal movements between the metal pipe and the sheath.

The metal tube is made to slide on the metal pipe. Therefore, a clearance will necessarily be provided between the metal pipe and the metal tube, and this clearance reduces the heat transfer between the sheath and the metal pipe.

The sheath can be made so that the ceramic composition forms a monolithic unit. Alternatively, it can be made in several parts which are joined together during assembly with the help of a refractory cement.

The inner cylindrical wall of the sheath is thus to consist of a thin metal tube.

It is preferred that the metal tube is made from sheet metal, this being an inexpensive way of producing metal tubes. A preferred method of manufacturing a sheet metal tube is to wind a sheet metal strip into the form of a pipe. The strip is preferably provided with longitudinal ridges and grooves, resulting in a helical corrugation of the sheet metal tube, which will consequently be able to absorb thermal movements more easily. The thin sheet metal tube can also be provided with welded-on anchoring pieces in a conventional mode for improved retention of the monolithic sheath. Steel fibres can also be mixed into the sheath composition, to reinforce it in a manner known per se.

The outer cylindrical wall can consist of e.g. a cardboard tube. However, we prefer to let this wall also consist of a sheet metal tube, preferably manufactured by winding a sheet metal strip into tubular shape. The Spiro tube, which is on the market, is suitable for this purpose. In this embodiment, the ceramic composition will thus be moulded between two sheet metal tubes which are part of the finished sheath. The sheet metal tubes protect the sheath against mechanical damage. If the sheath is part of a lance, e.g. for the decarborizing of molten steel, the outer sheet iron tube will indeed be dissolved by the molten steel, but only iron is added to the steel and not any foreign substances.

The refractory ceramic composition is moulded between the two coaxial tubes in a moist condition. To facilitate drying the composition, the tubes can be perforated with small holes. As examples of ceramic compositions can be mentioned alumina compositions and basic moulding and ramming compositions.

BEST MODE OF CARRYING OUT THE INVENTION WITH REFERENCE TO THE DRAWINGS

The invention will now be described with reference to the accompanying drawings.

FIG. 1 illustrates a portion of a lance which is provided with sheath in accordance with the invention.

FIG. 2 illustrates how the inner sheet metal tube can be provided with anchoring pieces.

FIG. 3 illustrates a lance with a sheath in accordance with the invention.

Figure 4:
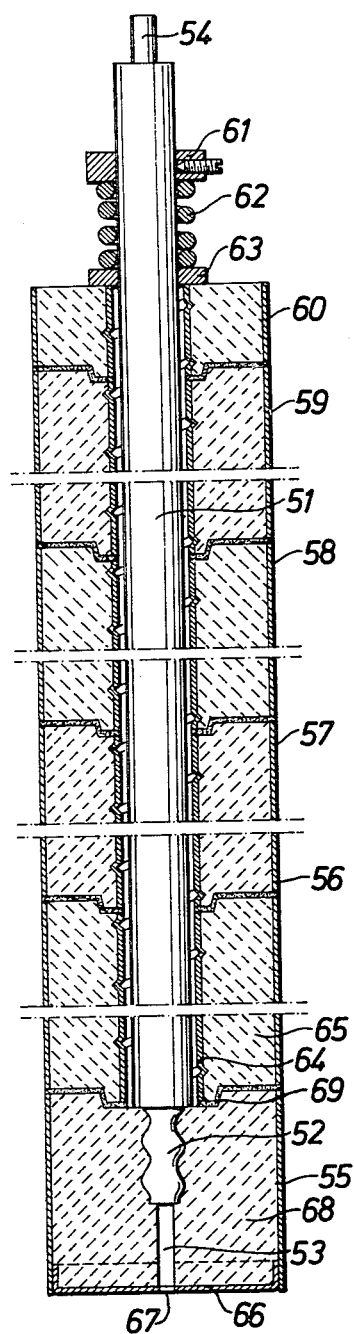
FIG. 4 illustrates a lance with the sheath consisting of several sections.

FIG. 1 illustrates a lance pipe 1 of steel, the threaded end 7 of which is fitted with a nozzle 5 made from alumina. The lance pipe 1 is surrounded by a sheath comprising a thin sheet metal tube formed by helically winding a sheet metal strip 3 with raised portions 3a, forming corrugations. Downwardly, the strip 3 is retained by a clamp 8. Coaxially with the tube 3 there is a cardboard tube 4, consisting of several sections joined together by collars 6. A refractory ceramic composition is to be moulded into the space 2 between the sheet metal tube 3 and cardboard tube 4 to complete the sheath. When the lance is used, the sheath will be attached to the lance pipe 1 via the clamp 8, but can otherwise slide along the lance pipe if there is thermal movement, because of the presence of the sheet metal tube 3.

FIG. 2 illustrates a steel pipe 10 surrounded by a thin sheet metal tube 11 with annular protuberances 12 forming corrugations. Anchoring pieces 15 are welded to the sheet metal tube. Coaxial with the tube 11 there is arranged a cardboard tube 13. A refractory ceramic composition is to be applied in the space 14 between the tubes 11, 13, this composition surrounding the anchoring pieces 15, thus being rigidly joined to the tube 11.

FIG. 3 illustrates a lance containing a steel pipe 21, which is upwardly provided with a nipple 22 for connecting a hose for the supply of oxygen, for example. The lower end of the pipe 21 is closed and provided with a support leg 24. Close to its lower end, the pipe 21 is provided with three radially extending nozzles 23. The pipe 21 is surrounded by an inner sheet metal tube 25 extending down to the nozzles 23, and by an outer sheet metal tube 26 coaxial with the inner tube. The bottom end of the outer sheet metal tube 26 is provided with a bottom 27, against which the support leg 24 engages. The space 28 between the sheet metal tubes is filled with a refractory ceramic composition. To facilitate the departure of water vapour from the ceramic composition, the outer sheet metal tube 26 is provided with some fine holes 29. The tube 26 is further provided with openings 30 coinciding with the ends of the nozzle 23. When the ceramic composition is poured in, the lance is suitably placed in a vertical position with the bottom 27 on a vibrating table, with the object of obtaining a dense composition. In the completed lance, the sheath will be united with the steel pipe 21 at its lower end, but is otherwise capable of sliding along the steel pipe, if there is any thermal movement, due to the gap between the steel pipe 21 and the inner sheet metal tube 25.

FIG. 4 illustrates a lance containing a steel pipe 51, having at its upper end a nipple 54 to be connected to a hose, and having at its lower end a screw-threaded portion 52 and an outlet nozzle 53. The steel pipe is protected by a sheath consisting of several sections 55-60. The adjacent surfaces of the sections have shoulders 69 for facilitating the assemblying of the sections to a coaxial position. An annular member 61 is mounted on the pipe 51 near its top end, supporting a helical spring 62 engaging a washer 63 supporting on the top section 60.

For manufacturing the lance the lower end 52, 53 of the steel pipe 51 is placed in a mould consisting of the sheet metal tube 55 of the lowermost section. Said sheet metal tube 55 has been provided with a bottom 66 having a central opening 67. A ceramic composition 68 is moulded in the mould thus formed. The ceramic body 68 will be firmly fastened to the steel pipe 51 because of the presence of the screw-threaded portion 52. The other sections 56-60 are manufactured by moulding a ceramic composition 65 in a mould consisting of an outer sheet metal tube 56 and an inner sheet metal tube 64. The completed sections are placed on the steel pipe 51. It is preferred to apply a refractory cement between adjacent surfaces of the sections. In this way the refractory composition of the entire sheath will form a monolithic unit. The washer 63, the spring 62, and the annular member 61 are now assembled, and the annular member 61 is fastened to the steel pipe 51 by means of a set-screw in a position to introduce a tension in the spring 62.

Figure 5:
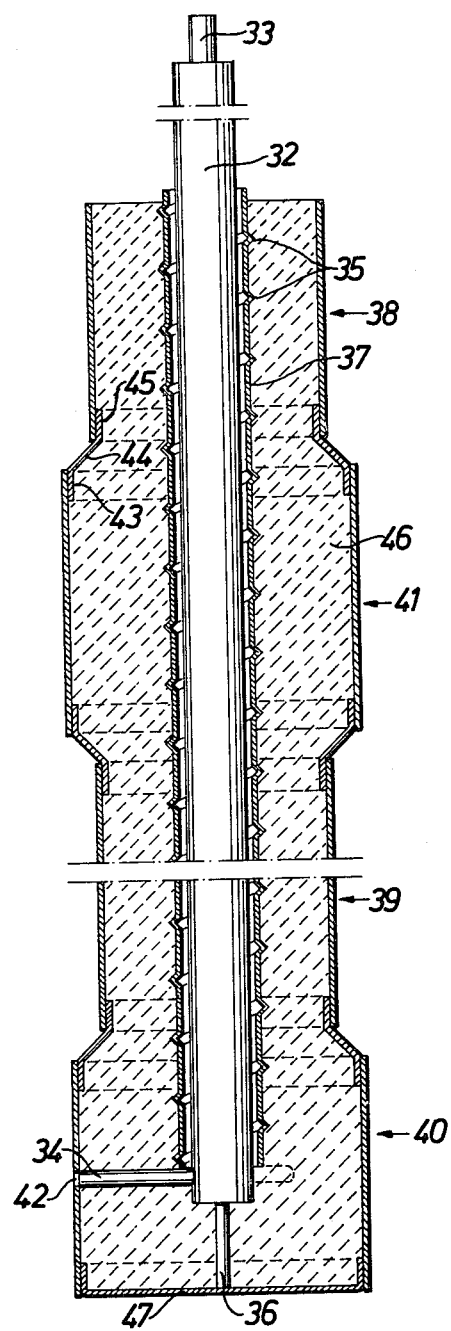
FIG. 5 illustrates a lance with thickened portions at exposed places.

The lance in FIG. 5 is intended for the injection of gaseous and pulverulent materials into a molten metal. It contains a steel pipe 32 with a nipple 33 for a hose, nozzles 34 and a support leg 36. The inner tube 37 of the sheath consists of a wound sheet metal strip with protruding portions 35 forming corrugations. The outer tube of the sheath consists of sections of different diameters, namely an upper narrow section 38, a wide section 41, which is calculated to come in the slag layer floating on the molten metal during use of the lance, a narrow section 39 situated thereunder, and bottommost a wide section 40, which is subjected to heavy stresses by the supplied gaseous and pulverulent materials flowing out through the openings 42 in the tube wall. The tube sections 38-41 are joined together with the aid of jointing muffs, each including a narrower cylindrical portion 43, a conical portion 44 and a wider cylindrical portion 45. The refractory ceramic composition 46 is preferably vibration compacted by the bottom 47 of the lower tube section 40 being placed on a vibrating table.

We claim:

1. A lance for supplying materials to metallurgical processes, comprising a steel tube, means at an inlet end of said tube for connecting the tube to a supply hose for said materials, at least one outlet opening for said materials at an outlet end of said tube, and a protecting sheath encompassing said tube, said sheath comprising an inner metal wall sized to form a clearance with said tube, an outer wall, and a refractory ceramic composition between said walls, and means for fastening a front end of said sheath to said steel tube adjacent said outlet end, a second end of said sheath being freely movable relative to said inlet end of said tube.

2. Apparatus according to claim 1 wherein the outer cylindrical wall comprises a sheet metal tube.

3. Apparatus according to claim 2 wherein at least one of said inner and outer sheet metal tubes comprises a helically wound sheet metal strip.

4. Apparatus according to claim 2, wherein at least one of said inner and outer sheet metal tubes is provided with circumferential corrugations on a side facing the ceramic composition.

5. Apparatus according to claim 2 wherein at least one of the sheet metal tubes is perforated for facilitating drying out of the refractory ceramic composition.

* * * * *